United States Patent [19]
Westphal et al.

[11] Patent Number: 6,070,471
[45] Date of Patent: Jun. 6, 2000

[54] METHOD AND APPARATUS DETERMINING TURBINE STRESS

[75] Inventors: Bernd Artur Karl Westphal, Clifton Park, N.Y.; Thane Montgomary Drummond, Roanoke, Va.

[73] Assignee: General Electric Co., Schenectady, N.Y.

[21] Appl. No.: 09/303,441

[22] Filed: May 3, 1999

Related U.S. Application Data

[62] Division of application No. 08/876,029, Jun. 12, 1997, Pat. No. 5,900,555.

[51] Int. Cl.$^7$ .................................................. G01B 7/16
[52] U.S. Cl. ........................ 73/766; 73/116; 342/492; 415/15
[58] Field of Search ................ 73/766, 116; 364/492, 364/494; 415/15, 17

[56] References Cited

U.S. PATENT DOCUMENTS

| | | | |
|---|---|---|---|
| 3,928,972 | 12/1975 | Osborne | 60/646 |
| 4,029,951 | 6/1977 | Berry et al. | 364/494 |
| 4,181,840 | 1/1980 | Osborne | 290/40 R |
| 4,303,369 | 12/1981 | Hisano et al. | 415/1 |
| 4,589,255 | 5/1986 | Martens et al. | 60/646 |
| 5,900,555 | 5/1999 | Westphal et al. | 73/766 |

*Primary Examiner*—Max Noori
*Attorney, Agent, or Firm*—Nixon & Vanderhye

[57] ABSTRACT

A method and apparatus for determining turbine rotor stresses in real time enables increased operation efficiency and more accurate stress determinations. The system calculates rotor bore and surface temperatures based on the time response of the rotor. The rotor surface temperature is measured using a sensor such as a thermocouple, and the measured rotor surface temperature is used to calculate rotor bore temperature and rotor average temperature based on time constants determined as a function of rotor geometry and material. The rotor surface thermal stress and the rotor bore thermal stress can be determined based on the measured and calculated temperatures.

10 Claims, 3 Drawing Sheets

METHOD AND APPARATUS DETERMINING TURBINE STRESS

This is a divisional of application Ser. No. 08/876,029, filed Jun. 12, 1997, now U.S. Pat. No. 5,900,555.

TECHNICAL FIELD

The present invention relates to a method and apparatus for determining turbine rotor stresses and, more particularly, to a method and apparatus for determining rotor surface temperature and rotor bore temperature in real time for accurately calculating turbine rotor stresses.

BACKGROUND

FIG. 1 illustrates an exemplary standard control configuration for a turbine control system. At the core of the control are three identical control processors, labelled <R>, <S> and <T>, providing triple redundant controls. All critical control algorithms, turbine sequencing, and primary protective functions are handled by these processors. The processors also gather data and generate alarms.

The three control processors accept input from various arrangements of redundant turbine and generator sensors. Data from some sensors is brought into all three control processors, and some data is divided among the control processors. The divided data can be exchanged on the voter link so that each control processor knows all sensor data. Voted sensor values are computed by each of the control processors, producing values that are used in control and sequencing algorithms for required control actions.

Stress calculations have been used in turbine monitoring and control applications. Conventionally, stress algorithms were very complex, requiring programming in separate software. This software was not easily changeable nor viewable. Moreover, a large array of constants of high resolution were required. Still further, due to the size and complexity of the previous stress algorithms, implementation required a special PROM set, which was configured separately from the three processor triple redundant controls, thereby incurring a significant additional cost. Furthermore, in the conventional systems, manual starting and loading instructions were determined based on stress calculations made remote from the turbine. Consequently, due to the inability to monitor the rotor surface metal stresses as they occur, the manual starting and loading instructions included very conservative ramp rates and hold times, thus wasting start-up time in operation. Additionally, conventional algorithms ran only about once every minute, which lead to a response time that is too slow for rapid steam and metal temperature changes as with combined cycle applications.

Rotor surface metal stress is proportional to the difference between surface metal temperature and average rotor temperature, and rotor bore (center) metal stress is proportional to the difference between average rotor and rotor bore temperatures. Conventionally, however, it has been difficult to rapidly determine accurate time lagged rotor bore temperatures and rotor average temperatures necessary for accurate and rapid thermal stress calculations.

DISCLOSURE OF THE INVENTION

It would thus be advantageous to determine rotor temperatures in real time to provide rapid and accurate rotor stress calculations. The present invention provides a method and apparatus for simplified calculation of turbine rotor stresses to be applied real time in the existing control configuration. In contrast with the conventional elaborate and detailed calculations, the system according to the present invention calculates bore and rotor average temperatures based on the time response of a rotor. Time delay and constants can be estimated from running the system against an exact method or can be selected from preexisting tables. In accordance with the invention, the surface metal temperature of the rotor is first measured and time delayed by several minutes. The time delayed surface temperature is used in a common first order time lag algorithm to calculate rotor bore temperature. The rotor average temperature is calculated first via arithmetically averaging the surface and calculated bore temperatures and applying a standard first order time lag algorithm to calculate the actual rotor average temperature. With these values, rotor surface and rotor bore metal stresses can be calculated.

Due to the simplified configuration, the system executes the stress calculation at least once per second, calculating surface metal stresses as they occur. Because no high-level language and floating point arithmetic is required, the algorithm can be programmed in one control block that can be easily incorporated into the triple redundant controllers as a regular part of the control sequence software. Consequently, the stress algorithm will not be unavailable due to failure or maintenance on its previously used single controller or due to problems with communications between controllers. Furthermore, the simplified algorithm makes manual staring and loading instructions unnecessary as the algorithm is applied real time and makes available actual rotor stresses as they occur. As a result, the method and apparatus according to the invention reduce actual startup times of turbines.

In accordance with one aspect of the invention, there is provided a method of calculating turbine rotor stresses for controlling a turbine output. The method includes the steps of determining a time lagged rotor average temperature Tv based on a rotor surface temperature Ts and a rotor bore temperature Tb, and calculating rotor stresses based on the time lag rotor average temperature Tv, the rotor surface temperature Ts and the rotor bore temperature Tb. The time lagged rotor average temperature Tv may be determined by measuring the rotor surface temperature Ts and determining a time delayed rotor surface temperature Td based on a shift time set in accordance with parameters of the rotor. In this context, the rotor bore temperature Tb is determined based on the time delayed rotor surface temperature Td. The rotor bore temperature may be further determined based on a bore temperature lag time constant set in accordance with parameters of the rotor. A rotor average temperature Ta may be determined based on the measured rotor surface temperature Ts, the rotor bore temperature Tb and a temperature constant set in accordance with parameters of the rotor. The time lagged rotor average temperature Tv may then be determined based on the rotor average temperature and an average temperature time lag constant set in accordance with parameters of the rotor.

In accordance with another aspect of the invention, there is provided a method of controlling turbine output in accordance with maximum allowable turbine rotor stresses. The method includes the steps of determining a time lagged rotor average temperature Tv based on a rotor surface temperature Ts and a rotor bore temperature Tb, calculating rotor stresses based on the rotor average temperature Tv, the rotor surface temperature Ts and the rotor bore temperature Tb and controlling turbine output based on a comparison between the calculated rotor stresses and the maximum allowable rotor stresses.

Finally, in accordance with yet another aspect of the invention, there is provided a control processor for controlling turbine output in accordance with maximum allowable turbine stresses. The control processor includes a controller, structure for determining a time lagged rotor average temperature Tv based on a rotor surface temperature Ts and a rotor bore temperature Tb, and a memory communicating with the controller and storing process algorithms for calculating turbine stresses based on the rotor surface temperature Ts and the rotor bore temperature Tb.

BRIEF DESCRIPTION OF THE DRAWINGS

These and other aspects and advantages of the present invention will become clear in the following description of the invention with reference to the accompanying drawings, in which.

BEST MODE FOR CARRYING OUT THE INVENTION

Figure 1:
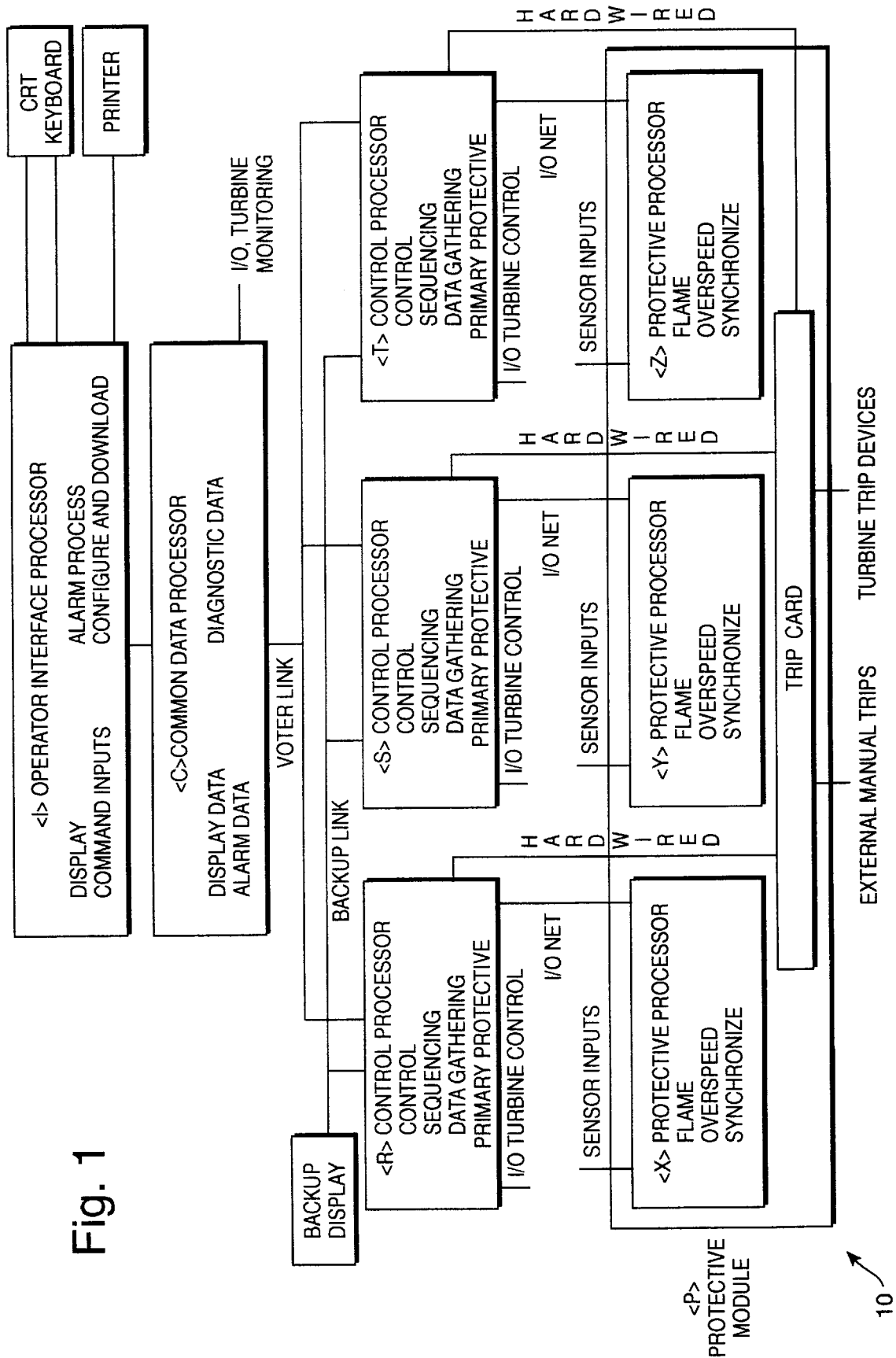
FIG. 1 is a schematic block diagram of a controller configuration according to the present invention.
Figure 2:
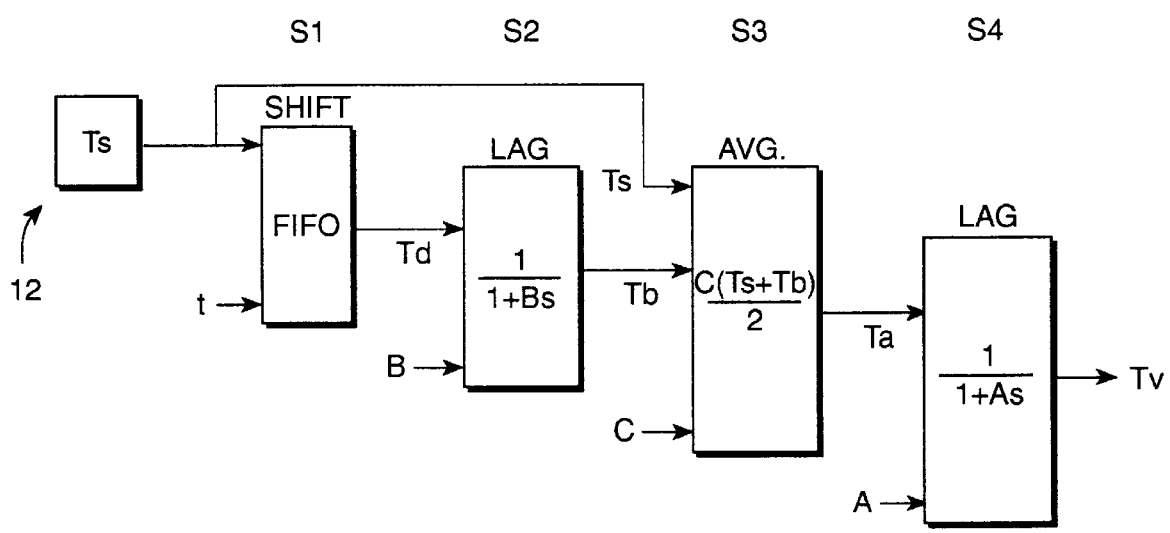
FIG. 2 is a flow diagram illustrating the method according to the present invention.

FIG. 2 is a flow diagram of the method according to the present invention. The method is carried out by the controller configuration 10, which is schematically illustrated in FIG. 1. In the method, a rotor surface metal temperature Ts is measured via one or more thermocouples 12 or like sensors and is input to a first in first out (FIFO) shift blot. If multiple thermocouples 12 are used for measuring rotor surface metal temperature Ts, an average result is used as the rotor surface metal temperature Ts, unless an error is detected in one of the thermocouples 12. It is known that calculated rotor bore temperatures only increase with a shift time delay after a surface metal temperature increase. The shift time delay increases linearly with rotor surface diameter. In step S1, the shift block time delays the surface metal temperature Ts in accordance with a predetermined shift time t, which is determined as a function of rotor geometry and material (see FIG. 3). A time delayed surface metal temperature Td is output from the shift block.

Figure 3:
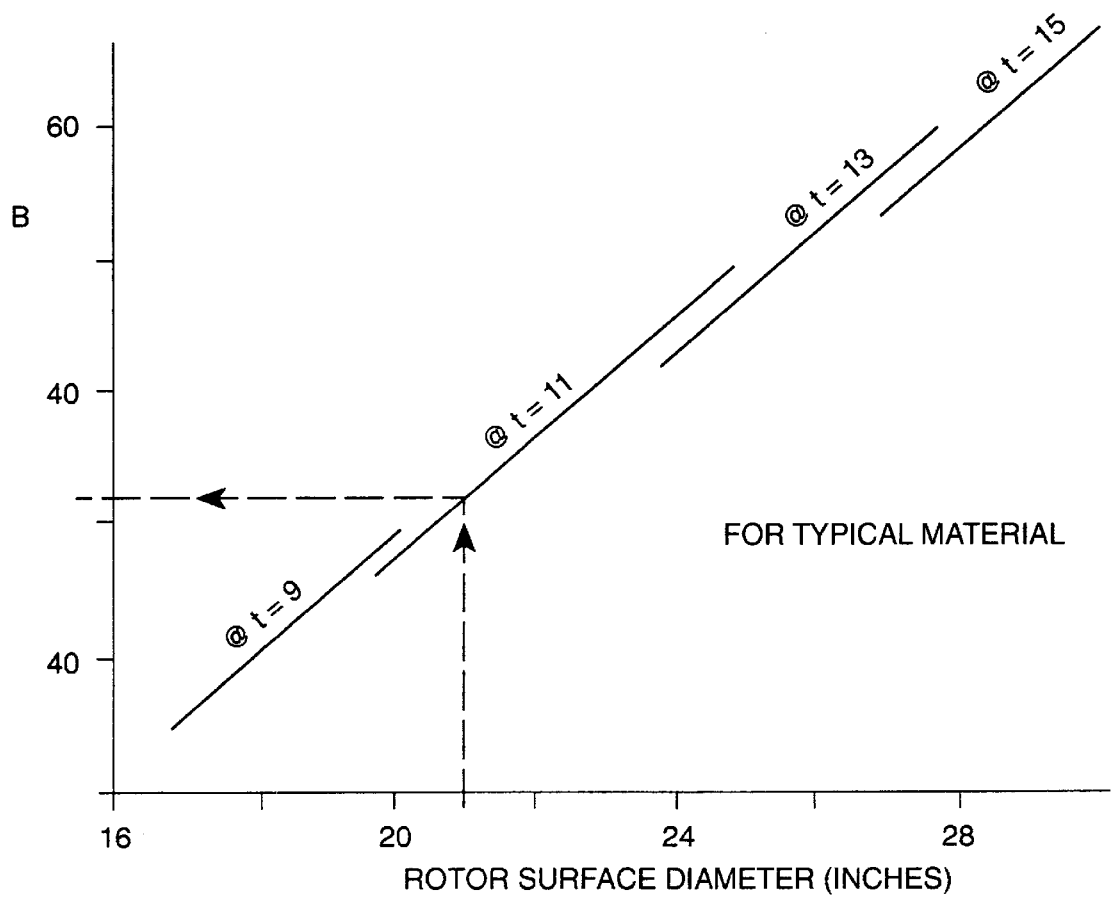
FIG. 3 is a graph illustrating the shift time constant and the bore temperature lag time constant as a function of the rotor surface diameter for a typical rotor material.

In step S2, the time delayed surface metal temperature Td is input to a first order time lag block A rotor bore temperature Tb is determined as a function of the time delayed surface metal temperature Td and a bore temperature lag time constant B set in accordance with parameters of the rotor (see FIG. 3). Similar to the shift time t, the bore temperature lag time constant B is a function of the rotor geometry and material. FIG. 3 is a graph illustrating the shift time t and bore temperature lag time constant B as a function of the rotor surface diameter for a typical rotor material.

Figure 4:
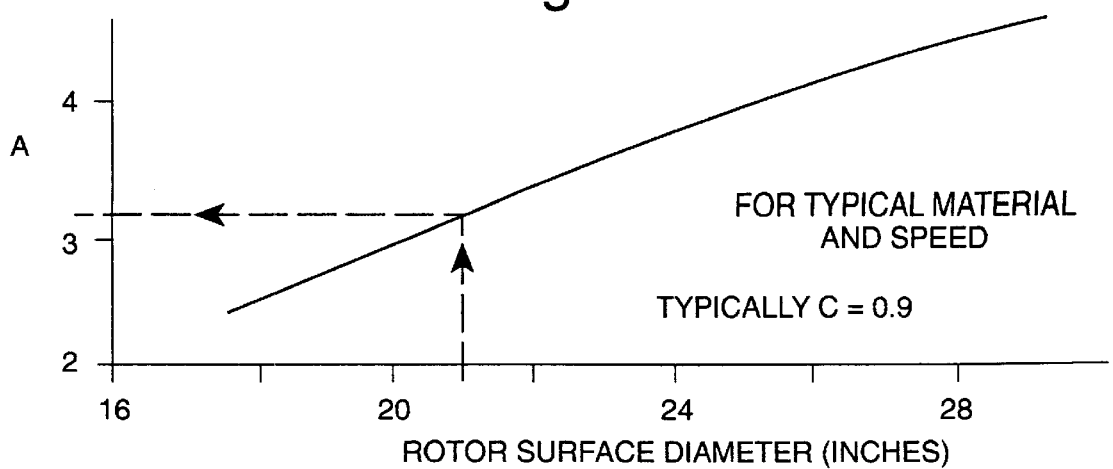
FIG. 4 is a graph illustrating the average temperature lag time constant and the temperature constant as a function of the rotor surface diameter for a typical rotor material and rotor speed.

In step S3, a rotor average temperature Ta is determined based on the measured rotor surface temperature Ts, the rotor bore temperature Tb and a temperature constant C set in accordance with parameters of the rotor (see FIG. 4). In this calculation, the average temperature Ta is determined by averaging the measured surface metal temperature Ts and the bore temperature Tb and multiplying by the temperature constant C, which is similarly dependent upon rotor geometry and rated rotor speed for a typical rotor material.

Finally, in step S4, the rotor average temperature Ta is input into a first order time lag block, and a time lagged rotor average temperature Tv is determined based on the rotor average temperature Ta and an average temperature time lag constant A set in accordance with parameters of the rotor (see FIG. 4). The time lag blocks contain Laplace operator representations of first order time delay.

Using standard rotor materials such as, for example, chrome molybdenum or other alloys, the shift time t is typically around 10 minutes. Moreover, though a significant time lag of approximately 20 to 60 minutes can be observed between surface metal temperature Ts and rotor bore temperature Tb, the time lag between surface metal temperature Ts and rotor average temperature Tv is typically only about 10 minutes.

Once the time lagged rotor average temperature Tv is determined in step S4, the rotor surface thermal stress and the rotor bore thermal stress can be determined in accordance with known principles, wherein:

rotor surface thermal stress=$K1*(Ts-Tv)$, and rotor bore thermal stress=$K2*(Tv-Tb)$ where Ts, Tb and Tv are as discussed above, and K1 and K2 are material coefficients that are determined as a function of the rotor material. The thus determined rotor stresses can be used to control acceleration and turbine output such as during start-up to reduce start-up times and protect the turbine against excessive rotor stresses.

In accordance with the present invention, a method and apparatus are provided that enable rapid and accurate calculation of rotor thermal stresses in real time in accordance with a time lagged rotor average temperature determined based on the measured rotor surface temperature and the time lagged rotor bore temperature. The system is programmable into a single control block and can be incorporated into the triple redundant controls executing primary control software. Moreover, the simplified algorithm makes manual starting and loading instructions unnecessary as the system according to the invention is real time and makes available actual rotor stresses as they occur.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of calculating turbine rotor stresses for controlling a turbine output, the method comprising:

(a) determining a time lagged rotor average temperature Tv based on a rotor surface temperature Ts and a rotor bore temperature Tb; and (b) calculating rotor stresses based on the time lagged rotor average temperature Tv, the rotor surface temperature Ts and the rotor bore temperature Tb.

2. A method as claimed in claim 1, wherein step (a) is practiced by measuring the rotor surface temperature Ts and determining a time delayed rotor surface temperature Td based on a shift time set in accordance with parameters of the rotor, wherein the rotor bore temperature Tb is determined based on the time delayed rotor surface temperature Td.

3. A method as claimed in claim 2, wherein the rotor bore temperature is further determined based on a bore temperature lag time constant set in accordance with parameters of the rotor.

4. A method as claimed in claim 2, wherein step (a) is farther practiced by determining a rotor average temperature Ta based on the measured rotor surface temperature Ts, the rotor bore temperature Tb and a temperature constant set in accordance with parameters of the rotor.

5. A method as claimed in claim 4, wherein step (a) is further practiced by determining the time lagged rotor average temperature Tv based on the rotor average temperature Ta and an average temperature time lag constant set in accordance with parameters of the rotor.

6. A method of controlling turbine output in accordance with maximum allowable turbine rotor stresses, the method comprising:

(a) determining a time lagged rotor average temperature Tv based on a rotor surface temperature Ts and a rotor bore temperature Tb;

(b) calculating rotor stresses based on the rotor average temperature Tv, the rotor surface temperature Ts and the rotor bore temperature Tb; and (c) controlling turbine output based on a comparison between the rotor stresses calculated in step (b) and the maximum allowable rotor stresses.

7. A method as claimed in claim 6, wherein step (a) is practiced by measuring the rotor surface temperature Ts and determining a time delayed rotor surface temperature Td based on a shift time set in accordance with parameters of the rotor, wherein the rotor bore temperature Tb is determined based on the time delayed rotor surface temperature Td.

8. A method as claimed in claim 7, wherein the rotor bore temperature is further determined based on a bore temperature lag time constant set in accordance with parameters of the rotor.

9. A method as claimed in claim 7, wherein step (a) is further practiced by determining a rotor average temperature Ta based on the measured rotor surface temperature Ts, the rotor bore temperature Tb and a temperature constant set in accordance with parameters of the rotor.

10. A method as claimed in claim 9, wherein step (a) is further practiced by determining the time lagged rotor average temperature Tv based on the rotor average temperature Ta and an average temperature time lag constant set in accordance with parameters of the rotor.

* * * * *